United States Patent
Krogull

(10) Patent No.: US 6,736,282 B2
(45) Date of Patent: May 18, 2004

(54) DEVICE FOR REDUCING SLOSHING OF FUEL IN A FUEL TANK

(75) Inventor: Christian Krogull, Gelsenkirchen (DE)

(73) Assignee: Siemens Aktiengesellschaft, Munich (DE)

( * ) Notice: Subject to any disclaimer, the term of this patent is extended or adjusted under 35 U.S.C. 154(b) by 14 days.

(21) Appl. No.: 10/161,466

(22) Filed: May 31, 2002

(65) Prior Publication Data

US 2002/0185492 A1 Dec. 12, 2002

(30) Foreign Application Priority Data

Jun. 12, 2001 (DE) .......................................... 101 28 308

(51) Int. Cl.$^7$ .............................................. B65D 90/52
(52) U.S. Cl. ...................................................... 220/563
(58) Field of Search ................................. 220/563, 562, 220/694, 720, 731, 890, 475; 280/830, 7, 837, 838, 839; 244/135 R, 135 B, 135 A

(56) References Cited

U.S. PATENT DOCUMENTS

| 4,262,710 | A | * | 4/1981 | Nomura et al. ................ 141/98 |
| 4,402,351 | A | * | 9/1983 | Momura et al. ................ 141/98 |
| 6,408,979 | B1 | * | 6/2002 | Forbes et al. ................ 181/198 |
| 2003/0015537 | A1 | * | 1/2003 | Konja ......................... 220/563 |

\* cited by examiner

*Primary Examiner*—Stephen Castellano
(74) *Attorney, Agent, or Firm*—Richard A. Speer

(57) ABSTRACT

In the case of a device for reducing sloshing of fuel in a fuel tank of a motor vehicle, a slosh-inhibiting element is of movable design for its movement from an installation position, in which it can be fitted through an installation opening of the fuel tank, into an operational position, in which it is latched to the wall of the fuel tank. The slosh-inhibiting element can therefore be fitted in a simple manner. The fuel tank is of particularly simple construction.

6 Claims, 4 Drawing Sheets

DEVICE FOR REDUCING SLOSHING OF FUEL IN A FUEL TANK

BACKGROUND OF THE INVENTION

The invention relates to a device for reducing sloshing of fuel in a fuel tank of a motor vehicle, having at least one slosh-inhibiting element.

A device of this type is frequently used in motor vehicles nowadays and is known in practice. Generally, a plurality of slosh-inhibiting elements are manufactured integrally with the bottom of the fuel tank or are welded thereto and reduce the speed of the fuel flowing to and fro, for example as the motor vehicle is cornering.

A disadvantage of the known device is that a mold of complicated design is required for the integral manufacturing of the fuel tank together with the slosh-inhibiting element. For example, slides and cores of the mold shape are required for recesses to be arranged in the slosh-inhibiting element. This results in a particularly cost-intensive manufacturing of the device.

The invention is based on the problem of designing a device of the type mentioned at the beginning in such a way that it can be produced in a particularly simple manner.

BRIEF SUMMARY OF THE INVENTION

This problem is solved according to the invention in that the slosh-inhibiting element is designed as a component which is to be manufactured separately from the fuel tank and can be fitted through an installation opening of the fuel tank.

This design enables the fuel tank to be produced in a particularly simple manner from shaped parts of simple construction by blow molding, deep drawing or by injection molding. As a result, the device according to the invention can be manufactured particularly cost-effectively. Since the installation opening is generally present in any case for the installation of a feed unit, an additional structural outlay on the fuel tank is avoided by the subsequent installation of the slosh-inhibiting element.

According to an advantageous development of the invention, the installation opening for the installation of the slosh-inhibiting element can be designed to be particularly small if the slosh-inhibiting element can be moved from an installation position of small dimensions into an operational position of large dimensions in relation to the installation position. The small dimensions of the installation opening result in the restricting of fuel emissions through seals of a flange closing the installation opening. Similarly, the small dimensions of the installation opening contribute to a particularly low structural outlay for the fuel tank.

According to another advantageous development of the invention, the securing of the slosh-inhibiting element within the fuel tank requires a particularly low structural outlay if the slosh-inhibiting element is fastened to a flange closing the installation opening of the fuel tank.

The slosh-inhibiting element could, for example, be bonded or welded in the fuel tank. However, according to another advantageous development of the invention, the installation of the slosh-inhibiting element turns out to be particularly simple if the slosh-inhibiting element and the wall of the fuel tank have latching means which correspond to one another.

According to another advantageous development of the invention, the slosh-inhibiting element fitted in the fuel tank has particularly high stability if it has stabilizing parts and/or fastening parts for the securing of at least one slosh-inhibiting part.

According to another advantageous development of the invention, the slosh-inhibiting element is moved reliably into the designated position in the fuel tank if the slosh-inhibiting part is manufactured from a shape memory material.

The manufacturing costs of the device according to the invention are further reduced if the slosh-inhibiting element is prestressed into the installation position.

According to an advantageous development of the invention, the slosh-inhibiting element turns out to be particularly small dimensions in the installation position if the slosh-inhibiting part is manufactured from an elastic material.

According to another advantageous development of the invention, the slosh-inhibiting element turns out to be particularly compact in the installation position if it is designed such that it can be rolled up.

According to another advantageous development of the invention, the manufacturing costs of the slosh-inhibiting element are further reduced if the slosh-inhibiting part is mounted pivotably on the fastening part.

The slosh-inhibiting element could be moved into the designated positions with a pulling mechanism or a lever device, for example. However, the movement of the slosh-inhibiting element requires a particularly low structural outlay if the fastening part has a guide element for moving the slosh-inhibiting part from the installation position into the operational position.

According to another advantageous development of the invention, the slosh-inhibiting element is held particularly reliably in the fuel tank by a spring element for prestressing the slosh-inhibiting element against the bottom of the fuel tank.

According to another advantageous development of the invention, the stabilizing element turns out to be particularly compact if the fastening part can be adjusted telescopically and has a spring element.

According to another advantageous development of the invention, a low weight of the slosh-inhibiting element can be achieved by means of a plurality of slosh-inhibiting parts arranged one above another at a designated distance from one another.

According to another advantageous development of the invention, a low weight with simultaneously high surge inhibition can be achieved in a simple manner if the slosh-inhibiting part is designed as a band of wide design corresponding to the height of the fuel tank with recesses arranged therein.

BRIEF DESCRIPTION OF THE DRAWINGS

The invention permits numerous embodiments. To further clarify its basic principle, a number of these are illustrated in the drawings and are described below.

FIG. 1 shows a device for reducing sloshing of fuel in a fuel tank 1 together with a surge-inhibiting element 2 before the installation. The fuel tank 1 has an installation opening 3 and respective latching means 4, 5 on its upper and lower walls. The latching means 4, 5 correspond to the latching means 4', 5' arranged at the ends of a fastening part 6 of a slosh-inhibiting element 2. The fastening part 6 has two sleeves 7, 8 which are displaceable telescopically in one another. The sleeves 7, 8 are prestressed away from each other by means of a spring element 9. A plurality of slosh-inhibiting parts 10 are mounted pivotably on one of the sleeves 8. The other sleeve 7 has guide elements 11 for moving the slosh-inhibiting parts 10 during the displacement of the sleeves 7, 8 in one another. In the position which is shown, the slosh-inhibiting parts 10 are folded on to one of the sleeves 7. This enables the slosh-inhibiting element 2 to be introduced into the fuel tank 1 through the installation opening 3.

FIG. 2 shows the device from FIG. 1 in the position when inserted in the fuel tank 1. The sleeves 7, 8 of the fastening part 6 are compressed together counter to the force of the spring element 9. The slosh-inhibiting parts 10 are folded into a position at right angles to the fastening part 6. Fuel which sloshes to and fro is retarded by the slosh-inhibiting parts 10. The installation opening 3 is closed by a flange 12.

FIG. 2a shows the device from FIG. 1, the slosh-inhibiting element 2 being arranged on the flange 12.

FIG. 3 shows schematically a sectional illustration through a further embodiment of the device with a slosh-inhibiting element 14 secured in a fuel tank 13. The slosh-inhibiting element 14 has a plurality of slosh-inhibiting parts 16 which are arranged one above another and are connected to one another via stabilizing parts 15. Latching means 17 are arranged in each case at the ends of the fastening parts 19, 20 arranged on the slosh-inhibiting element 14. One of the fastening parts 19 is fastened to a flange 22 fitted in an installation opening 21.

FIG. 4 shows the slosh-inhibiting element 14 from FIG. 3 for the installation, in a plan view. It can be seen here that the slosh-inhibiting parts 16 are manufactured from an elastic material. The slosh-inhibiting element 14 can therefore be fitted in the rolled-up state through the installation opening 21, illustrated in FIG. 3, in the fuel tank 13.

FIG. 5 shows a slosh-inhibiting element 23 for installation in the fuel tank 13 illustrated in FIG. 3, with a slosh-inhibiting part 24 in the form of a band. The slosh-inhibiting part 24 is manufactured from a material having a shape memory and has a plurality of recesses 25. Fastening parts 26, 27 having latching means 28, 29 are arranged at the ends. This slosh inhibiting element 23 can therefore be rolled up during installation in the same manner as the slosh-inhibiting element from FIG. 4 and introduced into the fuel tank 13 through the installation opening 21. Within the fuel tank 13, the slosh-inhibiting element 23 moves automatically into the designated position.

Figure 1:
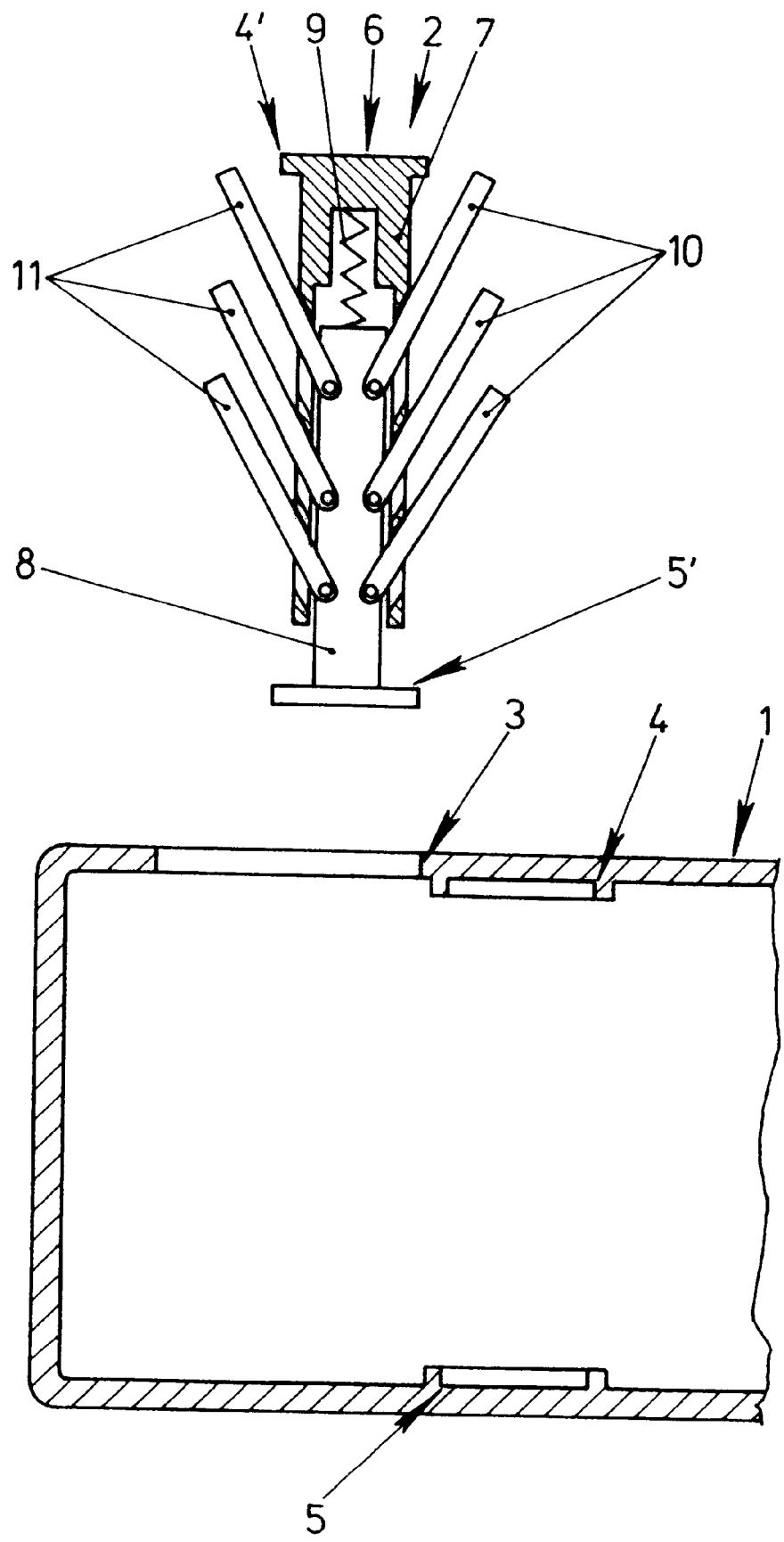
FIG. 1 shows a schematic sectional illustration of a device according to the invention during the installation.
Figure 2:
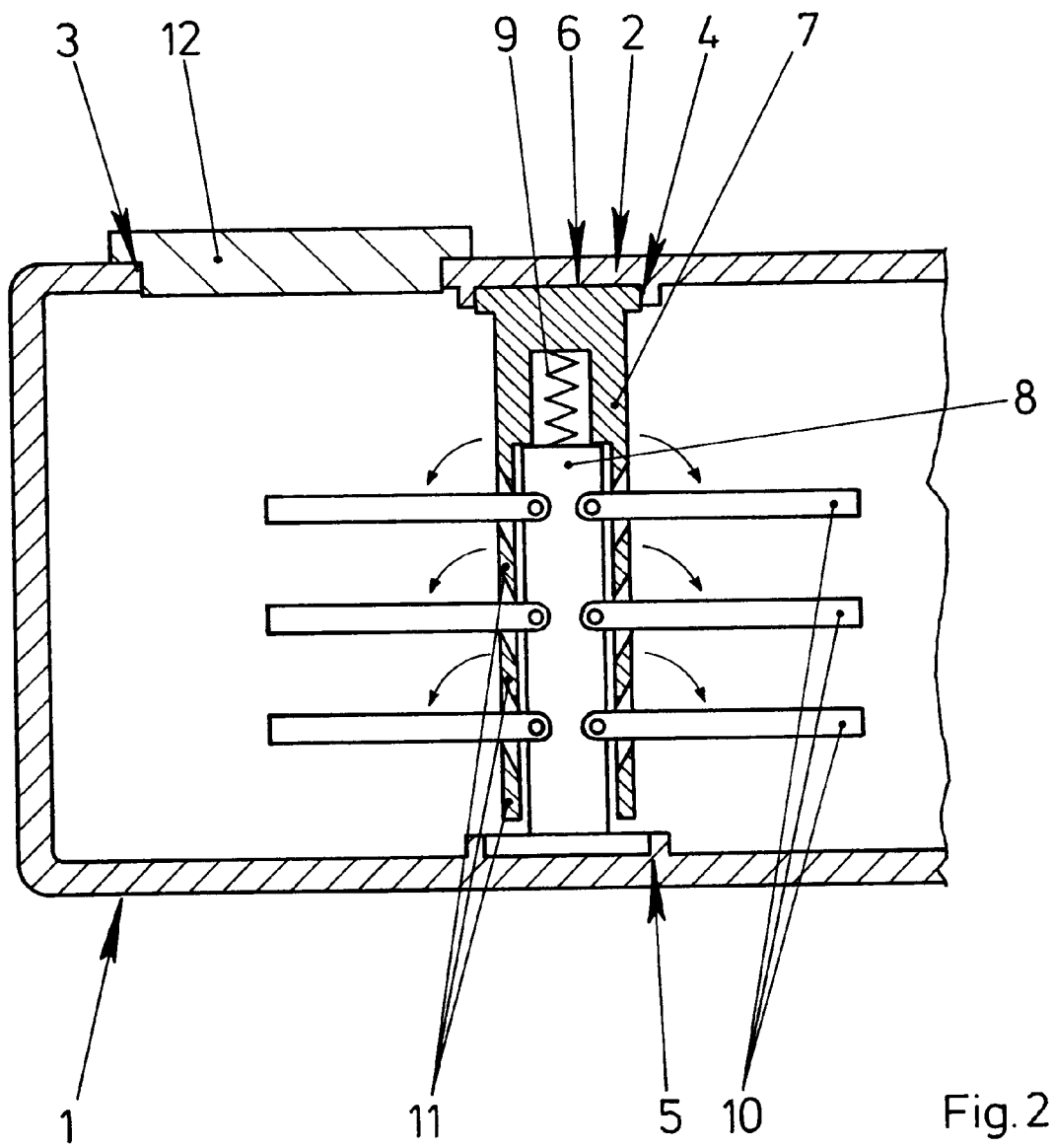
FIG. 2 shows a sectional illustration through the device according to the invention from FIG. 1 after the installation.
Figure 2A:
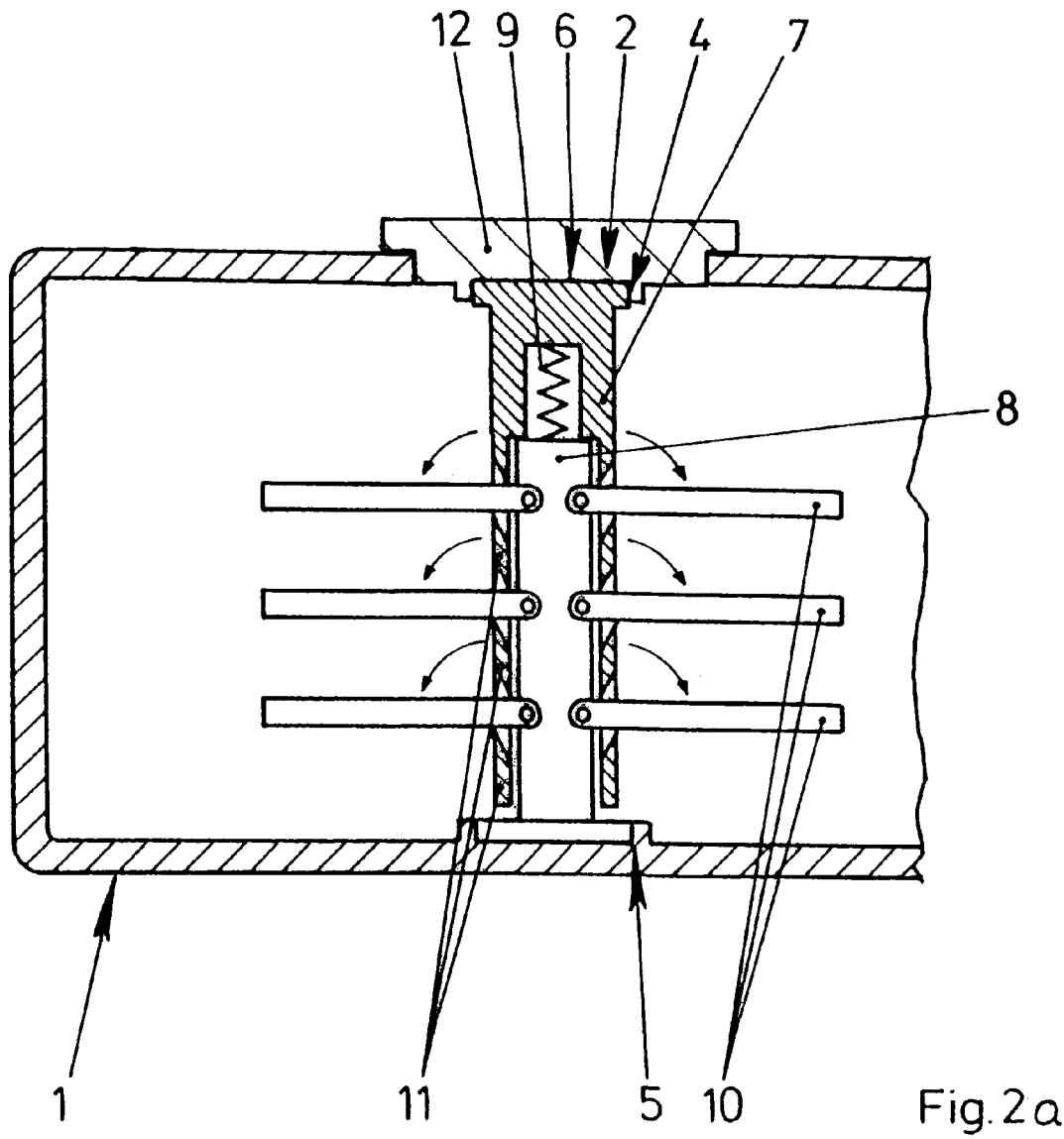
FIG. 2a shows a further embodiment according to FIG. 2.
Figure 3:
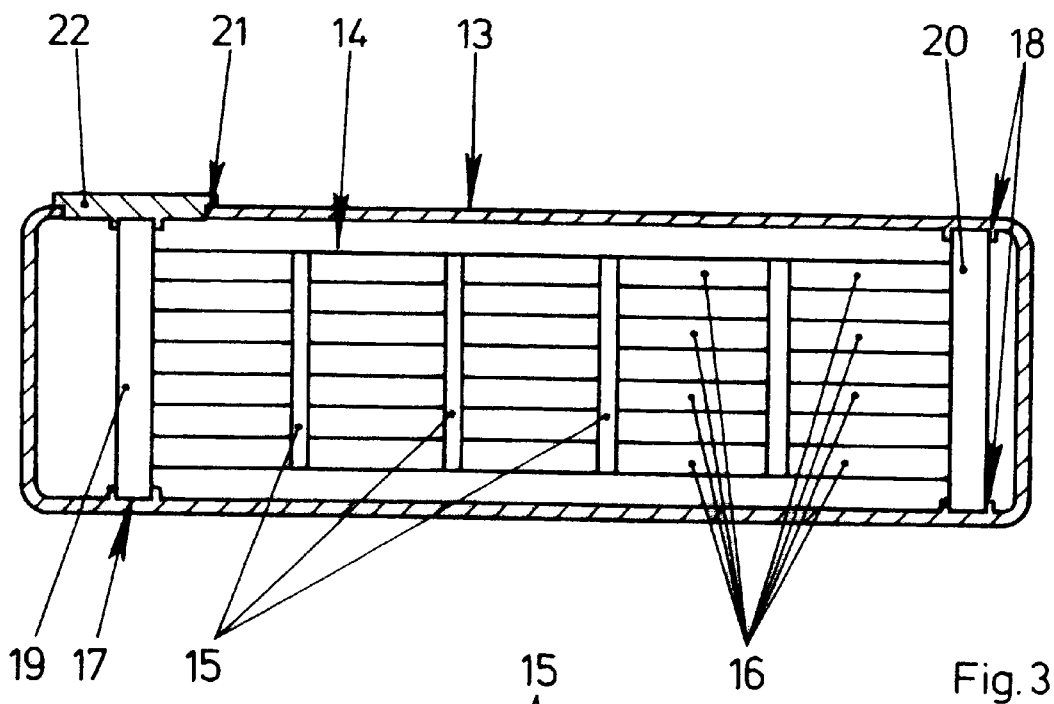
FIG. 3 shows a schematic sectional illustration through a further embodiment of the device according to the invention.
Figure 4:
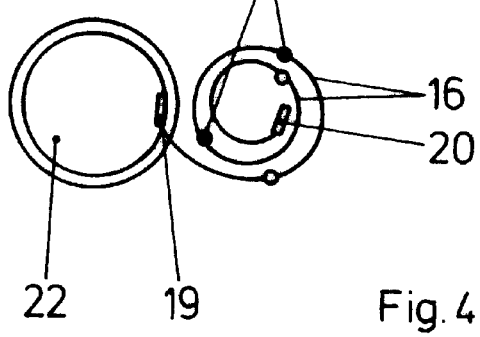
FIG. 4 shows a slosh-inhibiting element of the device according to the invention from FIG. 3 before the installation.
Figure 5:
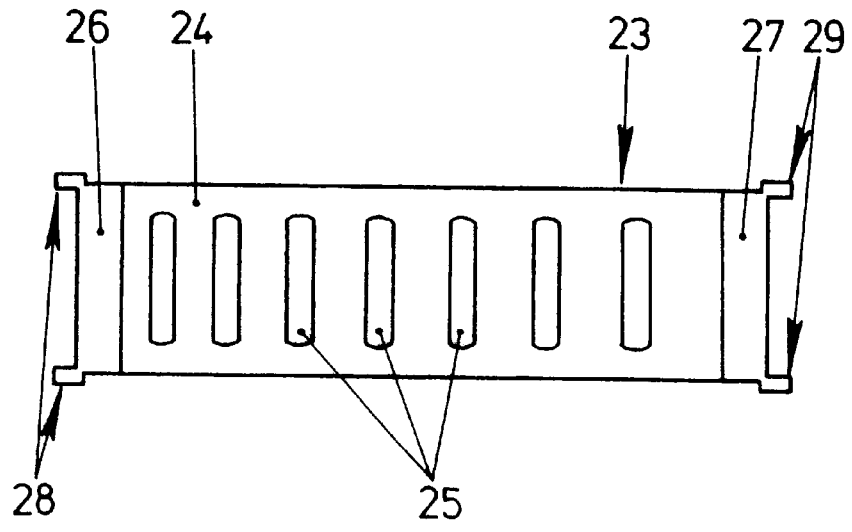
FIG. 5 shows a slosh-inhibiting element of a further embodiment of the device according to the invention.

What is claimed is:

1. A device for reducing sloshing of fuel in a fuel tank of a motor vehicle, comprising:

(a) fastening part having, (i), an elongated outer sleeve and, (ii), an elongated inner sleeve contained within the outer sleeve, the sleeves being axially movable with respect to each other;

(b) a plurality of guide elements defined by openings through the outer sleeve along the length thereof;

(c) a plurality of slosh inhibiting parts pivotally connected to the inner sleeve and extending through the openings in the outer sleeve and in contact with the outer sleeve guide elements, whereby longitudinal movement of the sleeves relative to each other causes arculate movement of the slosh inhibiting parts.

2. The device for reducing sloshing of fuel as defined in claim 1, characterized in that the slosh-inhibiting device can be moved from an installation position of small dimensions into an operational position of large dimensions in relation to the installation position.

3. The device as described in claim 1 or 2, characterized in that the inner and outer sleeves and the wall of the fuel tank (1, 13) have latching means which correspond to one another.

4. The device as defined in claim 1 or 2, characterized in that the inner and outer sleeves are prestressed into an installation position.

5. The device as defined in claim 1, characterized by a spring element positioned between the inner and outer sleeves for prestressing the sleeves against opposing walls of the fuel tank.

6. The device as defined in claim 1, wherein the plurality of slosh-inhibiting parts are arranged one above another at a designated distance from one another.

* * * * *